H. W. PLEISTER.
CONDUIT OR CABLE CLAMP AND BRIDLE RING.
APPLICATION FILED MAY 7, 1920.

1,381,228.

Patented June 14, 1921.

INVENTOR
Henry W. Pleister
BY
Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,381,228.　　　　　　　Specification of Letters Patent.　　Patented June 14, 1921.

Original application filed January 23, 1920, Serial No. 353,623. Divided and this application filed May 7, 1920. Serial No. 379,517.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

This application is a division of my copending application Ser. No. 353,623, filed January 23, 1920.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a socket or recess to receive the shank of a wire bridle ring, which has preferably, though not necessarily, been properly bent upon itself to form a U-shaped member or hook. Such a member serves to fill the socket or recess and prevents rattling. My invention further relates to means on the cable clamp for receiving and holding the other end of the bridle ring.

My invention further relates to a conduit or cable clamp which is preferably formed out of sheet metal and is provided with coöperating surfaces to receive and hold the two ends of a bridle ring. My invention further relates to bridle rings which are used with my improved conduit and cable clamps.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combination, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1:
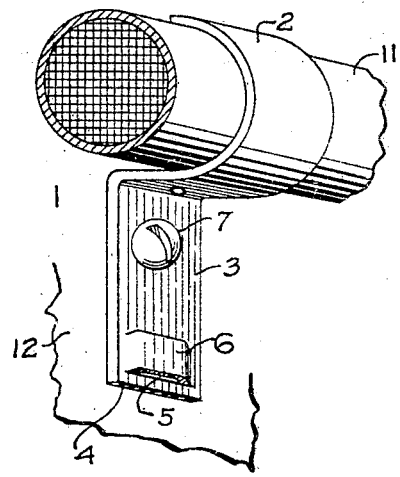
Figure 1 is a perspective view of my conduit and cable clamp and of a cable which it supports.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal. Near the bottom portion 4 of the base, I form an integral socket or recess 5 by striking up the portion 6 of the base, so that it lies in a plane parallel to the rest of the base 3.

Preferably, though not necessarily, it is below the securing screw 7. I also provide the conduit or cable clamp with means to secure the other end of the bridle ring.

Figure 4:
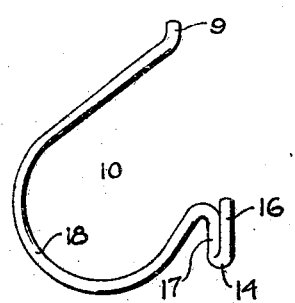
Fig. 4 is a perspective view of one form of wire bridle ring which I preferably employ.

In Fig. 1 I have shown the conduit or cable clamp provided with a hole 8 to receive the hook 9 upon one end of the wire bridle ring 10, Fig. 4. Preferably, though not necessarily, this hole 8 lies on the opposite side of the securing screw 7 from the socket or recess 5.

The conduit or cable clamp 1 supports the cable 11 on the wall or other suitable support 12 by means of the screw 7, which may be screwed into said wall before attaching the wire bridle ring 10 to the clamp.

Figure 2:
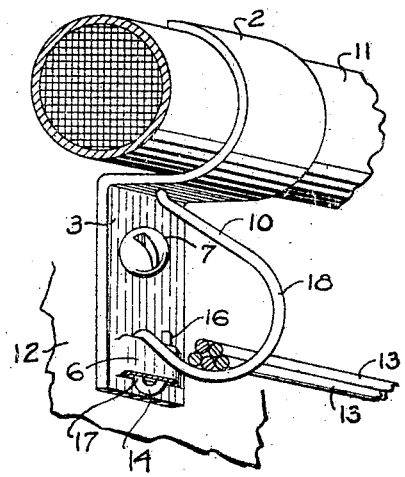
Fig. 2 is a perspective view of the conduit and cable clamp shown in Fig. 1 with the addition of a bridle ring formed from bent wire.
Figure 3:
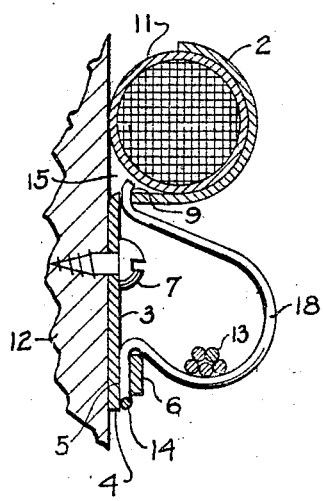
Fig. 3 is a vertical section through the conduit and cable clamp shown in Fig. 2.

Whenever it becomes necessary to increase the capacity of the installation by stringing bridle wires 13, 13 this can be easily done by hooking the hook 14 of the bridle ring 10 within the socket or recess 5 and then springing the other hook 9 into the hole 8, when the bridle wires 13, 13 can be strung as shown in Fig. 2. It will be noted that in this form of my invention that the hooks 9 and 14 fit snugly in the elongated socket or recess 5 and hole 8 respectively, so that there is no rattling or movement between the cable clamp and the bridle ring after they have once been positioned. Moreover the bridle wires 13, 13 are completely inclosed and cannot work free of the bridle ring. In this form of my invention the hook 9 extends up very slightly into the dead space 15, Fig. 3, so that the hook 9 securely holds one end of the bridle ring but does not touch, cut, scratch or mar the cable 11.

Should it ever be desirable to remove the bridle wires 13, 13, this can be easily done by compressing the wire bridle ring 10 so as to release the bent hook 9 from the hole 8 which will then permit the hook 14 to be lifted out of the socket or recess 5. This permits my wire bridle rings to be added to, or removed from any particular conduit or cable clamp, and repositioned on another cable clamp at some future time.

In my invention the arms 16 and 17, which make the U-shaped member or hook 14 preferably are so spaced from each other, that they give a little or are compressed when the hook 14 is forced into the recess or pocket 5. This insures that this end of the wire bridle ring will not only be hooked into the socket or recess, but will be held therein against rattling; the spring of the bow 18 of the wire bridle ring serves also to keep both hooks 14 and 9 into firm contact with the conduit or cable clamp 1.

It will be noted that in my improved construction no tapping or screw-threading of the conduit or cable clamp is required, nor is it necessary to place screw-threads upon the wire bridle rings.

This, of course, saves considerable expense in the manufacture of the article and reduces the amount of metal necessary to make the conduit or cable clamp. The wire of these rings may moreover be of comparatively narrow gage.

Having thus described this invention in connection with an illustrative embodiment thereof, to the details of which I do not desire to be limited, what is claimed as new and what is desired to secure by Letters Patent is set forth in the appended claims.

What I claim is:

1. The combination of a conduit or cable clamp formed out of sheet material having a hook portion, a base having a struck up portion forming an elongated socket or recess to receive one end of a bridle ring and provided with means to receive the other end of the bridle ring, and a wire bridle ring having one end bent back on itself to fill the elongated pocket on the base to prevent rattling, its other end being held by the means carried by the clamp.

2. The combination of a conduit or cable clamp formed out of sheet material having a hook portion, a base having a struck up portion forming an elongated socket or recess to receive one end of a bridle ring and provided with means to receive the other end of the bridle ring, and a wire bridle ring having one end bent to form a hook to engage in said pocket or recess its other end being held by the means carried by the clamp.

3. A new article of manufacture comprising a wire bridle ring having a bent hook at one end, and a compressible or yielding hook at the other end.

4. A new article of manufacture comprising a wire bridle ring having a bent hook at one end, and a U-shaped member forming the hook on the other end.

HENRY W. PLEISTER.

Witnesses:
MARY R. RYAN,
A. M. WILLIAMS.